US 6,728,703 B1

(12) United States Patent
Wan et al.

(10) Patent No.: US 6,728,703 B1
(45) Date of Patent: Apr. 27, 2004

(54) SYSTEM AND METHOD FOR PROCESSING MOVEMENT/DELTA METRICS

(76) Inventors: Qiang Wan, 4512-145th Pl. SE., Bellevue, WA (US) 98006; James Boorn, 24053-197th Pl. SE., Maple Valley, WA (US) 98038; Ping Luo, 17359 NE. 14th St., Woodinville, WA (US) 98072

(*) Notice: Subject to any disclaimer, the term of this patent is extended or adjusted under 35 U.S.C. 154(b) by 474 days.

(21) Appl. No.: 09/894,802

(22) Filed: Jun. 29, 2001

(51) Int. Cl.[7] .............................................. G06F 17/00
(52) U.S. Cl. ................... 707/3; 707/6; 707/10
(58) Field of Search .................. 707/1–10, 200–206, 707/100–104.1

(56) References Cited

U.S. PATENT DOCUMENTS 6,611,829 B1 * 8/2003 Tate et al. ....................... 707/2
6,615,205 B1 * 9/2003 Cereghini et al. ............. 707/3
6,658,432 B1 * 12/2003 Alavi et al. .................... 707/1

OTHER PUBLICATIONS

Ramsak et al., Interactive ROLAP on large datasets: a case study with UB–trees, Database Engineering & Applications, 2001 International Symposium on, Jul. 16–18, 2001, pp. 167–1786.*

Jensen et al., Specifiying OLAP cubes on XML data, Scientific and Statistical Database Management, 2001, SSDBM 2001, Proceedings, Thirteenth International Conference on, Jul. 18–20, 2001, pp. 101–112.*

Fidalgo et al., Providing OLAP interoperability with OLAPWare, Computer Science Society, 2002, SCCC 2002, Proceedings, 12h International Confence on the Chilean, Nov. 6–8, 2002, pp. 167–176.*

* cited by examiner

Primary Examiner—David Jung

(57) ABSTRACT

A system and method for processing movement/delta metric data are provided. A processing system obtains one or more data records including movement/delta metric data. The processing system filters the data records according to a regular identification and time key filters and generates a match table and a time-filtered records table. The match table contains data records matching both queries and the time-filtered records table contains data records matching the regular identification key filters but not the time key filters. The processing system merges the match table with the time-filtered records table to generate an aggregated multi-dimensional grid display.

24 Claims, 14 Drawing Sheets

|  | REGION | QUARTER | MONTH | INVENTORY |
|---|---|---|---|---|
|  | SW | Q1 2000 | FEB | -35 |
|  | NW | Q1 2001 | FEB | -237 |
|  | NW | Q1 2001 | MAR | -23 |
|  | NW | Q4 1999 | DEC | +100 |
|  | SW | Q1 2001 | MAR | -32 |
|  | ⋮ | ⋮ | ⋮ | ⋮ |
|  | SW | Q4 1999 | DEC | +128 |
|  | SW | Q1 2000 | MAR | +467 |
|  | SW | Q1 2000 | JAN | +256 |
|  | SW | Q2 2000 | APR | -50 |
|  | SW | Q1 2001 | JAN | +23 |
|  | SW | Q2 2001 | APR | -237 |
|  | ⋮ | ⋮ | ⋮ | ⋮ |
|  | SW | Q1 2000 | FEB | +589 |
|  | NW | Q2 2000 | JAN | +689 |
|  | NW | Q4 2000 | NOV | +50 |
|  | SE | Q1 2001 | DEC | +50 |

Column headers labeled: 34A, 34B, 34C, 34D. Table labeled 34. Arrow to node D.

| REGION | QUARTER | MONTH | INVENTORY |
|---|---|---|---|
| SW | Q1 2000 | JAN | +256 + 128 = +384 |
| SW | Q1 2000 | FEB | -35 |
| SW | Q1 2000 | MAR | +467 |
| SW | Q1 2001 | JAN | +23 |
| SW | Q1 2001 | FEB | +589 |
| SW | Q1 2001 | MAR | -32 |
| NW | Q1 2001 | JAN | +689 |
| NW | Q1 2001 | FEB | -237 |
| NW | Q1 2001 | MAR | -23 |

*Fig.12.*

| REGION | QUARTER | MONTH | INVENTORY |
|---|---|---|---|
| SW | Q1 2000 | JAN | +384 |
| SW | Q1 2000 | FEB | -35 |
| SW | Q1 2000 | MAR | +467 |
| SW | Q1 2001 | JAN | +23 - 50 = -27 |
| SW | Q1 2001 | FEB | +589 |
| SW | Q1 2001 | MAR | -32 |
| NW | Q1 2001 | JAN | +689 |
| NW | Q1 2001 | FEB | -237 |
| NW | Q1 2001 | MAR | -23 |

Fig.13.

| REGION | QUARTER | MONTH | INVENTORY |
|---|---|---|---|
| SW | Q1 2000 | JAN | +384 |
| SW | Q1 2000 | FEB | -35 |
| SW | Q1 2000 | MAR | +467 |
| SW | Q1 2001 | JAN | -27 |
| SW | Q1 2001 | FEB | +589 |
| SW | Q1 2001 | MAR | -32 |
| NW | Q1 2001 | JAN | +100 |
| NW | Q1 2001 | JAN | +689 |
| NW | Q1 2001 | FEB | -237 |
| NW | Q1 2001 | MAR | -23 |

| REGION | QUARTER | MONTH | INVENTORY |
|---|---|---|---|
| SW | Q1 2000 | JAN | +384 |
| SW | Q1 2000 | FEB | -35 |
| SW | Q1 2000 | MAR | +467 |
| SW | Q1 2001 | JAN | -27 |
| SW | Q1 2001 | FEB | +589 |
| SW | Q1 2001 | MAR | -32 |
| NW | Q1 2001 | JAN | +100 |
| NW | Q1 2001 | JAN | +689 + 50 = +739 |
| NW | Q1 2001 | FEB | -237 |
| NW | Q1 2001 | MAR | -23 |

36D

| REGION | QUARTER | MONTH | INVENTORY |
|--------|---------|-------|-----------|
| SW | Q1 2000 | JAN | +384 |
| SW | Q1 2000 | FEB | +384 − 35 = +349 |
| SW | Q1 2000 | MAR | +349 + 467 = +816 |
| SW | Q1 2001 | JAN | −27 + 816 = +789 |
| SW | Q1 2001 | FEB | +789 + 589 = +1378 |
| SW | Q1 2001 | MAR | +1378 − 32 = +1346 |
| NW | Q1 2000 | JAN | +100 |
| NW | Q1 2001 | JAN | 100 + 739 = +839 |
| NW | Q1 2001 | FEB | +839 − 237 = +572 |
| NW | Q1 2001 | MAR | +572 − 23 = +549 |

*Fig.15.*

| | Q1 2000 | | | |
|---|---|---|---|---|
| | JAN | FEB | MAR | TOTAL |
| SW | 384 | 349 | 816 | 816 |
| NW | 100 | 100 | 100 | 100 |
| | | | | 916 |

| | Q1 2001 | | | |
|---|---|---|---|---|
| | JAN | FEB | MAR | TOTAL |
| SW | 789 | 1378 | 1346 | 1346 |
| NW | 839 | 572 | 549 | 549 |
| | | | | 1895 |

SYSTEM AND METHOD FOR PROCESSING MOVEMENT/DELTA METRICS

FIELD OF THE INVENTION

In general, the present invention relates to computer software, and in particular, to a system and method for processing movement/delta metrics utilizing metric aggregation rules.

BACKGROUND OF THE INVENTION

Generally described, metric data may be collected and presented in a variety of manners. For example, metric data may include information related to the amount money stored in bank account, the number of products shipped by a manufacturer, the amount of inventory maintained by a corporation, and the like. Often, metric data is organized according to one or more keys that identify the source of the data. The identification keys can include regular keys that identify a characteristic of the metric data, such as location identifier (e.g., Northwest), a product identifier (e.g., a product name). The identification keys can also include time keys that identify a particular time period from which the metric data was collected, such as time, date, month identifier and fiscal quarter identifier.

As the metric data is collected, the raw data may be stored and maintained in one or more databases for retrieval and processing. The databases can include data files, relational databases, and any other data storage component. FIG. 1 is a block diagram illustrative of a database record 48 including metric data. As illustrated in FIG. 1, the database record 48 includes one or more identification keys, such as a "TIME" key 50A, a "PRODUCT" key 50B, and a "REGION" key 50C. The database record 48 also includes metric data, such as a "DOLLARS" metric 52A and a "QUANTITY" metric 52B. Accordingly, a processing system can access the raw data within the database records to perform various processing tasks involving multiple database records.

One typical metric data processing task involves the use of aggregation rules to present a user with metric data trends. For example, a manufacturer may wish to obtain processed data displaying the quantity of product that was shipped out on a monthly basis. Accordingly, the processing system would obtain the raw metric data from the data sources and group the data by a product identifier key (if there is more than one product) and a time identifier key to get the necessary data.

The ability for a processing system to process raw metric data depends on the type of metric data maintained within a data store. In one embodiment, the metric data includes independent, finite numbers that illustrate a sampling of a quantity/value at the particular instance of time, generally referred to as regular metrics. Examples of regular metrics can include the total dollar amount or quantity of sales/purchases over a defined period of time, and the like. Accordingly, regular metric data provide a "snapshot" of a total of amount of an item being counted.

FIG. 2 is a flow diagram illustrative of a regular metric processing routine 200 utilized by a processing system, such as an accounting processing system, to process raw regular metric data from a data source. At block 202, the system obtains the raw data store, such as a data file, and applies one or more filter keys. It is assumed that each database records includes one or more identification keys, such as the "TIME," "PRODUCT," and "REGION" fields illustrated in FIG. 1. Accordingly, the processing system selects which identification key and what values of the key correlate to the desired results. In an illustrative embodiment, assume that the processing system must generate sales dollars for the first and second fiscal quarters of the year 2000 for product X. Based on the above identifiers, the processing system would filter the raw metric data to include all records that had "product X" in the product key 50B and that would be included in the first and second fiscal quarters of the year 2000 (e.g., January, February, and March 2000 and April, May and June 2000).

At block 204, the processing system applies aggregation rules on the regular metric data matching the filter key values. Once the processing system has identified the raw metric data that corresponds to the desired results, the processing system aggregates the matching metric data that will be necessary to get the final output. With reference to the previous example, the processing system would aggregate the January, February, and March data to obtain the first fiscal quarter number and the April, May and June data to obtain the second fiscal quarter number. At block 206, the processing system calculates sub-totals for the aggregated metric data.

At block 208, the processing system places the aggregated metric data and sub-total data into a multi-dimensional grid for presentation. With reference again to the illustrative example, the processing system would place the totals for each month (January–June) into a grid and the sub-totals for the first and second fiscal quarters. At block 210, the routine 200 terminates.

For a variety of reasons, metric data may not always be maintained in terms of regular metrics. Instead, the raw metric data may be stored, and subsequently needs to be processed, as movement/delta metric data. One skilled in the relevant art will appreciate that movement/delta metric data is a finite number that increases/decreases a running total calculated from previous movement/delta metric data. Examples of movement/delta metric data include inventory movement, headcount change, asset value change, open order amount changes, and the like. For example, a bank generally keeps track of asset value changes by accounting for deposits as an addition to the account (e.g., +$50) and withdrawals as a subtraction to the account (e.g., −$25). However, database records containing movement/delta metric data do not include a "snapshot" of the total of the asset value, but rather adjust a running total.

Conventional aggregation rules processing system are deficient in attempting to process movement/delta metric data. In one aspect, the conventional aggregation rule processing method is deficient because the movement/delta metric is dependent on previous data, the conventional processing method does not take into account database records that do not match the filter keys, but contain data necessary to calculate the matching record total. For example, assume the processing system desired to calculate the total amount of inventory for February based on a record indicating a "+25" total for February and a year total of 100 in December. To calculate the proper result, the processing system would have to take into account the movement/delta metric for January and December, even though these records would not be included in the desired results as determined by conventional aggregation rules.

In another aspect, the conventional processing method is further deficient in the not properly processing movement/delta metric data including null, or zero, values. For example, assume that the processing system desired to calculate an open order balance for the first fiscal quarter with movement/delta metric data indicating a "+10," null (no activity) and "−2" values for the first three months. In a conventional aggregation rule processing method, the processing system would treat the order balance for the second month as null (no activity), instead of the correct answer as "no change." Accordingly, the system would have to carry over the balance from the previous month, which conventional processing systems are unable to do.

Some systems are capable of processing movement/delta metric data. However, these systems are limited in the type of processing that can be accomplished. For example, some systems require the movement/delta metric data to be stored sequentially according to a time identification key to allow the system to take in account records immediately before a record of interest. Other systems are limited in not allowing arbitrary beginning and ending periods for data processing or arbitrary inclusion and exclusion of keys. For example, some systems are limited to processing movement/delta metric solely on a monthly basis with a single point of "ending balance" (such as a monthly banking statement).

Thus, there is a need for a metric data processing system that extends regular metric aggregation rules to process movement/delta metric in a variety of manners over data records stored in a variety of formats.

SUMMARY OF THE INVENTION

A system and method for processing movement/delta metric data are provided. A processing system obtains one or more data records including movement/delta metric data. The processing system filters the data records according to a regular identification key filters and time key filters and generates a match table and a time-filtered records table. The match table contains data records matching both filters and the time-filtered records table contains data records matching the regular identification key filters but not matching the time key filters. The processing system merges the match table with the time-filtered records table to generate an aggregated multi-dimensional grid display.

In accordance with an aspect of the present invention, a method for processing data records including movement/delta metric data in an analytical processing environment is provided. A processing system obtains a database containing the data records and generates a match table and a time-filtered records table from the data records. The processing system merges the time-filtered records table with one or more records in the match table and presents the merged match table records in a multi-dimensional table.

In accordance with another aspect of the present invention, a computer-readable medium having computer-executable modules for processing data records including movement/delta metric data in an analytical processing environment is provided. The computer-readable medium includes a match table module including a table of data records from a data source matching a regular identification key filter and a time key filter. The match table module is operable to obtain a total value for movement/delta metric data. The computer-readable medium also includes a time-filtered records table module including a table of data records matching the regular identification filter, but not matching the time key filter. The time-filtered records table module is operable to provide additional movement/delta metric data corresponding of the calculation the final "SUM-TO-DATE" value for the movement/delta metric data.

In accordance with a further aspect of the present invention, a system for processing movement/delta metric data is provided. The system includes a data source including one or more data records that contain at least one field having movement/delta metric data. The system further includes means for processing the movement/delta metric field data according to an inputted set of criteria. Finally, the system includes means for displaying the processed movement/delta metric field data.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 10A and 10B are block diagrams illustrative of the generation of a match table, time-filtered record table and time list of value (TLOV) table from a set of data in accordance with the present invention;

FIGS. 11, 12, 13, 14 and 15 are block diagrams of the match table of FIG. 10B illustrating the processing of metric data in accordance with the present invention; and FIG. 16 is a block diagram of a multi-dimensional data display in accordance with the present invention.

DETAILED DESCRIPTION OF THE PREFERRED EMBODIMENT

Figure 3:
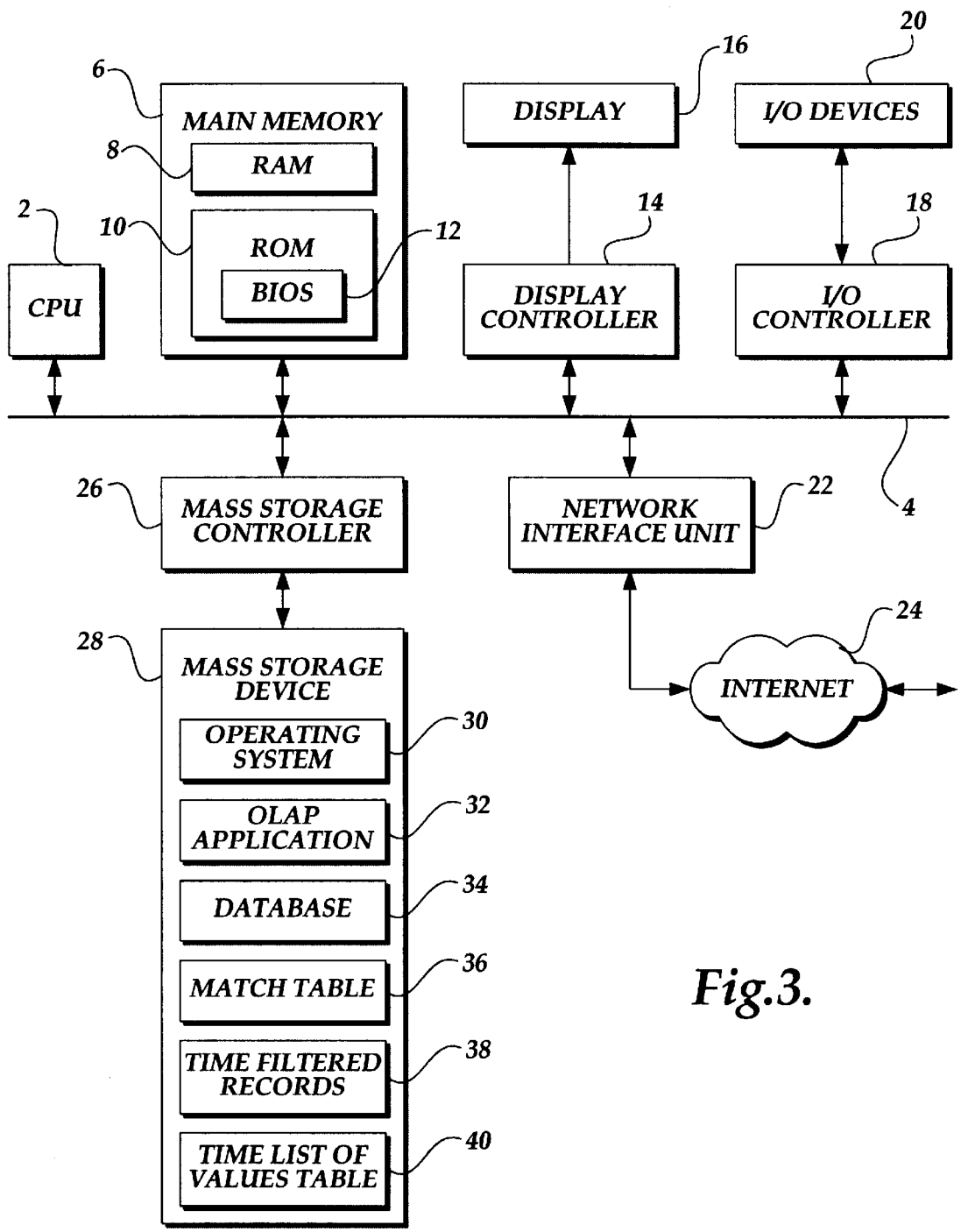
FIG. 3 is a block diagram of a computer system suitable for implementing a metric processing system in accordance with the present invention.

FIG. 3 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general purpose computing device in the form of a computer 1. Components of a computer 1 include, but are not limited to, a processing unit 2, a system memory 6, and a system bus 4 that couples various system components including the system memory to the processor. The system bus 4 may any of several types of bus structure including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

Computer 1 typically includes a variety of computer-readable media. Computer-readable media can be any available media that can be accessed by computer 1 and includes both volatile and non-volatile media, removable and non-removable media. By way of example, and not limitation, computer-readable media may comprise computer storage media and communication media. Amended in any method or technology for storage of information such as computer-readable instructions, data structures, program modules or other data. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 1. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 6 includes computer storage media in the form of volatile and/or non-volatile memory such as read only memory (ROM) 10 and random access memory (RAM) 8. A basic input/output system 12 (BIOS), containing the basic routines that help to transfer information between elements within the computer 1, such as during start-up, is typically stored in ROM 10. RAM 8 typically contains data and/or program modules that are immediately accessible to and/or presently being operated on by the processing unit 2.

The computer 1 may also include a removable/non-removable, volatile/non-volatile mass storage device 28. By way of example only, the mass storage device 28 can include a hard disk drive that reads from or writes to non-removable, non-volatile magnetic media, a magnetic drive it reads from or writes to removable, non-volatile magnetic disk, and an optical disk drive that reads from or writes to a removal, non-volatile optical disk such as CD-ROM, DVD or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The mass storage device 28 is connected to the system bus 4 by a mass storage controller 26, such as a Small Computer System Interface (SCSI) or other storage device interface.

The drives and their associate computer storage media discussed above and illustrated in FIG. 3, provide storage of computer-readable instructions, data structures, program modules and other data for the computer 1. In FIG. 3, for example, the mass storage device 28 is illustrated as storing an operating system 30, an on-line analytical processing application ("OLAP") 32, one or more database files 34, a match table 36, a time-filtered records table 38 and a time list of values ("TLOV") table 40. The function/properties of the OLAP application 32, database file 34, match table 36, time-filtered records table 38 and TLOV table 40 will be discussed in greater detail below.

A user may enter commands and information into the computer 1 via the system bus 4 by utilizing various input/output devices 20, such as a keyboard, pointing devices, commonly referred to as a mouse, track ball or touch pad, a microphone, a joystick, a game pad satellite dish, scanner, or the like. These and other input/output devices 20 are connected to the system bus 4 through an I/O controller 18 utilizing communication interfaces such as a parallel port, a game port or other universal serial bus (USB).

The computer 1 may also generate one or more displays associated with the present invention via a display, such as a monitor, via a display controller 14 connected to the system bus 4. In addition to the display 16, the computer 1 may also use other peripheral output devices such as speakers and printers, which may be connected through an output peripheral interface.

The computer 1 may operate in a network environment using a network interface unit 22 to communicate with one or more remote computers. The remote computer may be a personal computer, a server, a router, a network PC, a peer device or other common network node, and typically includes many or all of the elements described above relative to the computer 1. The computer 1 may communicate with the remote computers by utilizing a local area network ("LAN") or a wide area network ("WAN"), such as the Internet 24. However, alternative networks, such as Intranets, are encompassed within the suitable operating environment.

One skilled in the relevant art will appreciate that some aspects of the present invention may utilize the World Wide Web ("WWW"). The WWW is a vast collection of interconnected or "hypertext" documents written in HyperText Markup Language (HTML) or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks (e.g., highlighted portions of text which link the document to other hypertext documents possibly stored at a WWW site elsewhere on the Internet). Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is known to those skilled in the art, WWW server may also includes facilities for storing and transmitting application programs, which is application programs written in the JAVA™ programming language from Sun Microsystems, for execution on a remote computer. Likewise WWW server may also include facilities for executing scripts or other application programs on the WWW server itself.

A consumer or other remote user may retrieve hypertext documents from the WWW via WWW browser application program. WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present invention relates to a system and method for processing movement/delta metric data. In accordance with an actual embodiment, the present invention will be described in relation to a system for processing data in which movement/delta metric data is acquired from a data source, such as an OLAP database, and processed according to regular metric aggregation rules. More specifically, the system utilizes a match table, a time-filtered records table and a TLOV table to process movement/delta metric data. One skilled in the relevant art will appreciate that the disclosed embodiments are illustrative in nature and should not be construed as limiting.

Figure 1:
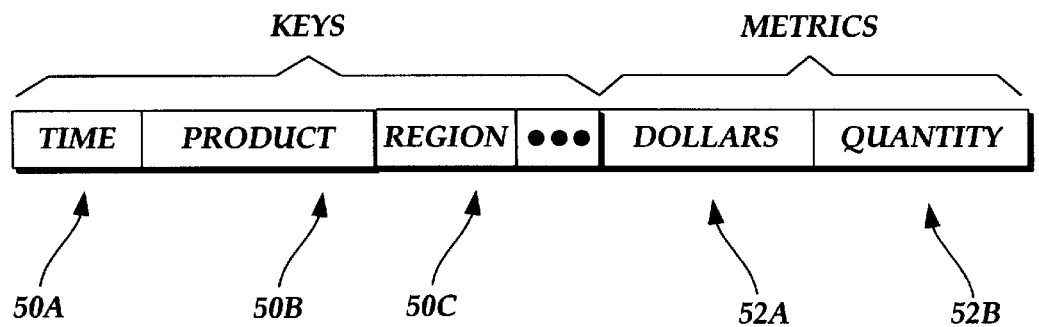
FIG. 1 is a block diagram illustrative of a database record including identifier and metric data in accordance with the present invention.
Figure 2:
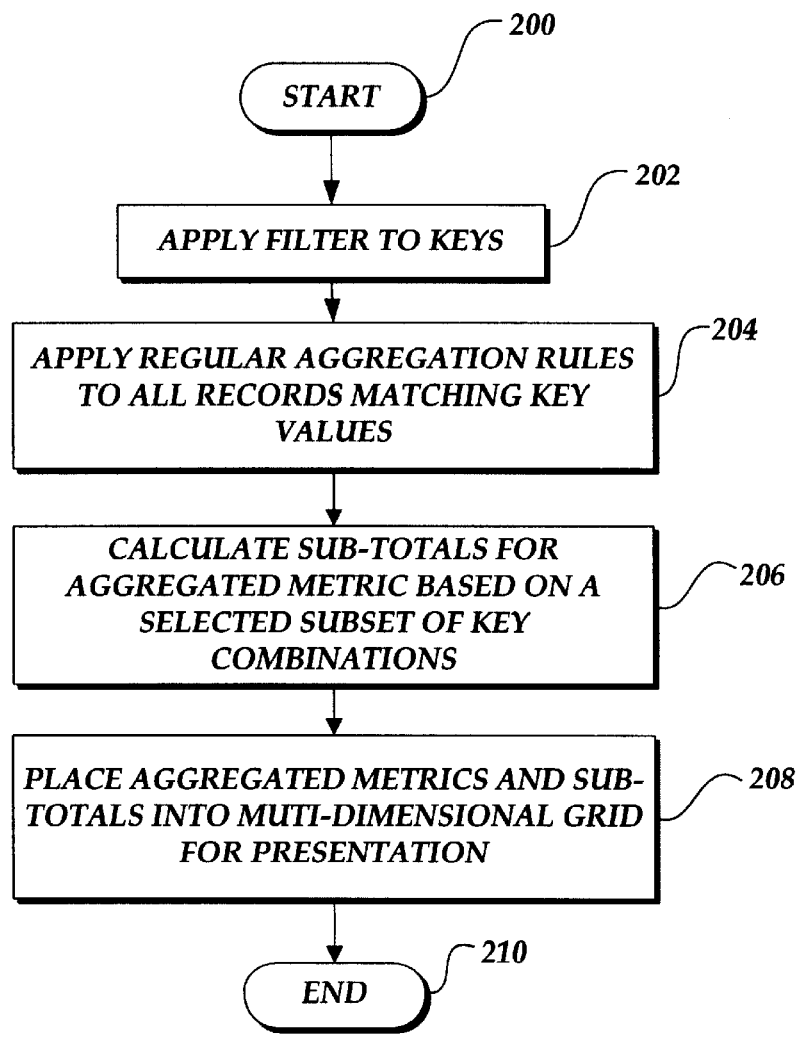
FIG. 2 is a flow diagram illustrative of a conventional regular metric processing routine.
Figure 4:
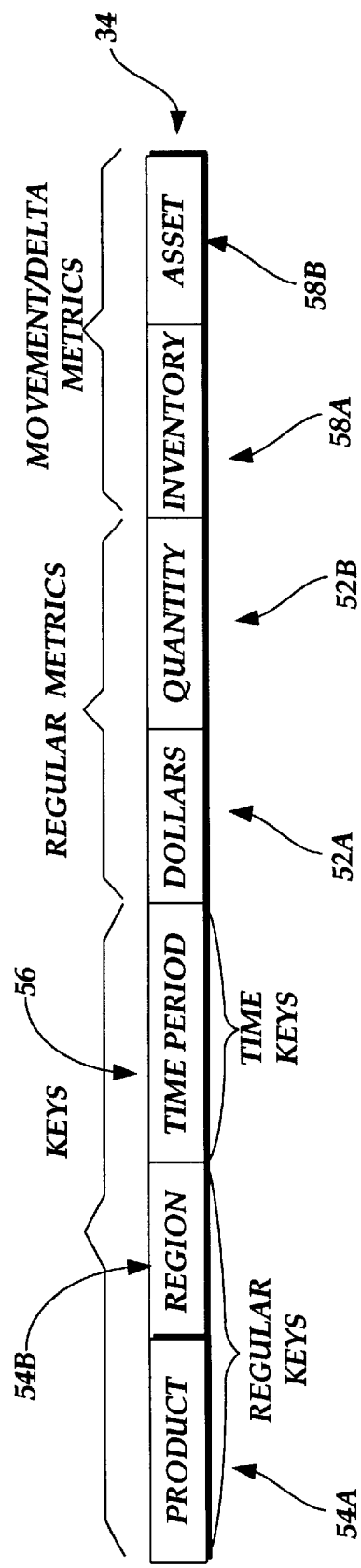
FIG. 4 is a block diagram illustrative of a database record including identifier, regular metric and movement/delta data in accordance with the present invention.

FIG. 4 is a block diagram illustrative of a database record 34 including one or more identification keys, regular metric and movement/delta data in accordance with the present invention. Similar to the database record 28 (FIG. 1), the database record 34 includes one or more regular identification keys, such as a "PRODUCT" key 54A and a "REGION" key 54B. The database record can also include a time identification key, such as "TIME" key 56. In an illustrative embodiment of the present invention, the database record 34 may also include one or more regular metric fields, such as a "DOLLAR" field 52A and a "QUANTITY" field 52B. Additionally, in accordance with the present invention, the database record 34 includes one or more fields containing movement/delta metric data. In an illustrative embodiment of the present invention, the database record 34 includes a "INVENTORY" field 58A and a "ASSET" field 58B. One skilled in the relevant art will appreciate that the database record 34 does not need to include regular metric data.

Figure 5:
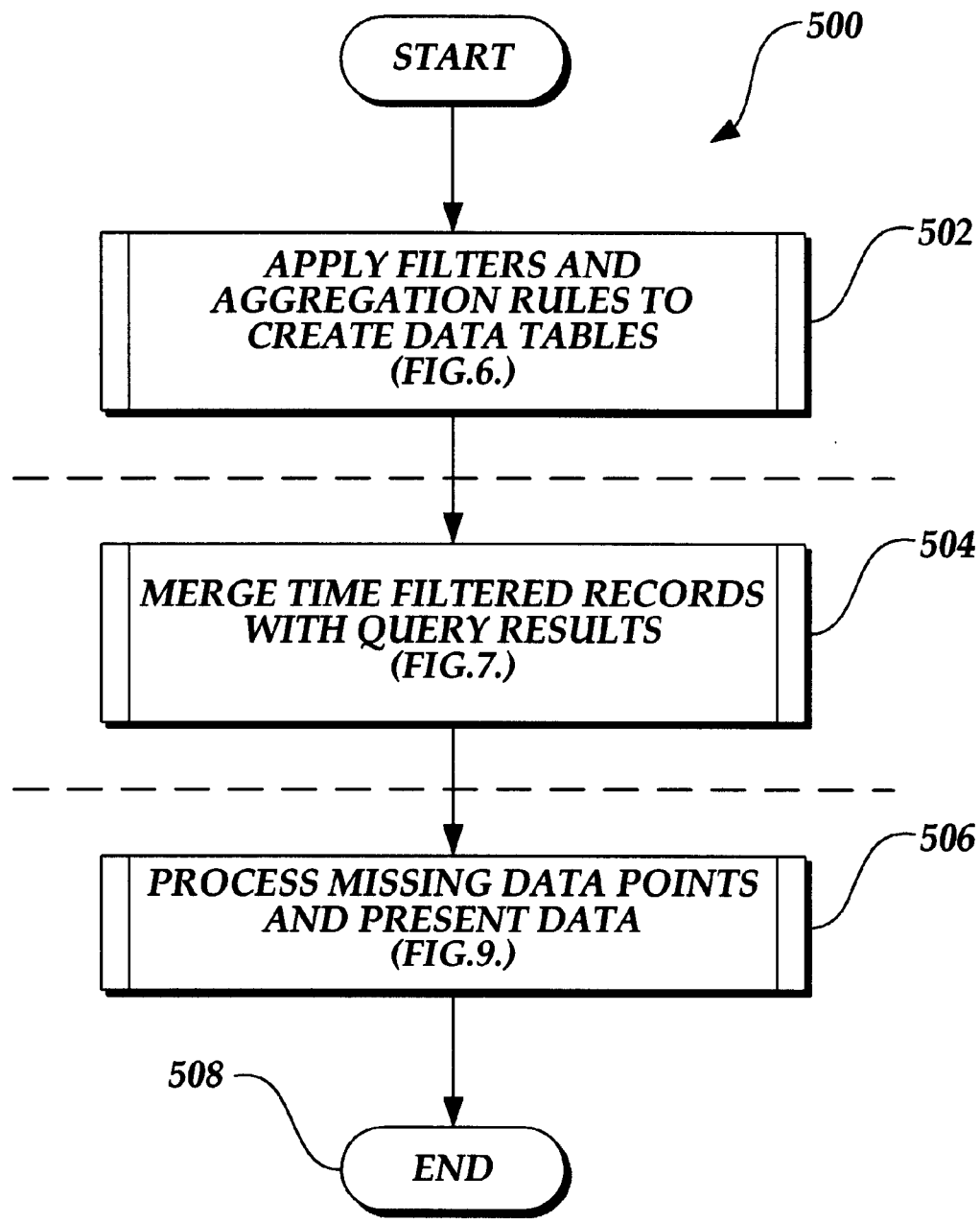
FIG. 5 is a flow diagram of a metric data processing routine in accordance with the present invention.

FIG. 5 is a flow diagram illustrative of a data processing routine 500 utilized by the OLAP application 32 of the computer 1 to process movement/delta metric data in accordance with the present invention. At block 502, the OLAP application 32 applies key filter rules and aggregation to create the data tables.

Figure 6:
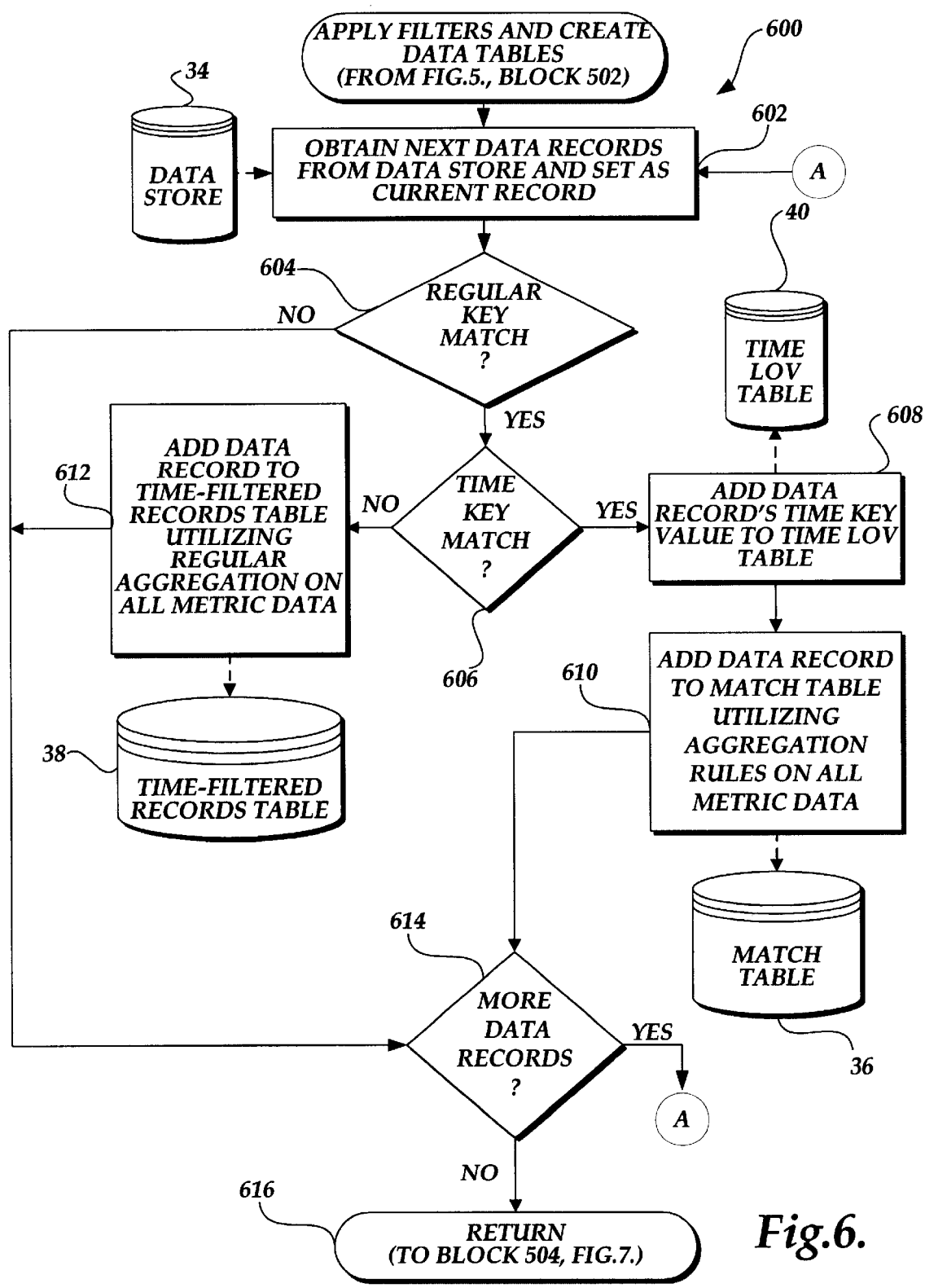
FIG. 6 is a flow diagram illustrative of a filter and aggregation rule sub-routine in accordance with the present invention.

FIG. 6 is a flow diagram of a sub-routine 600 implemented by the OLAP application 32 to apply key filter and aggregation rules in accordance with the present invention. At block- 602, the OLAP application 32 obtains the next database record from a database 34 and sets the record as the current record.

At decision block 604, a test is done to determine whether the current record matches the regular key filter data. In an illustrative example, assume that the OLAP application 32 is requested to obtain and display a total amount of inventory for the NW and SW regions for the first fiscal quarters of the year 2000 and 2001. Accordingly, applying decision block 604, the OLAP application 32 would select all records corresponding to the inventory product that included a "NW" or "SW" identifier in a region field, such as "REGION" key 54A (FIG. 4). If the current record does not match the regular identification key filter criteria, the routine 600 proceeds to decision block 614, which will be explained in greater detail below. If the current record matches the regular identification key filter criteria, at decision block 606, a test is done to determine whether the current record matches the time key filter criteria. With reference to the previous example, the OLAP application 32 would select the current record if a time identification field, such as "TIME" key 56, indicates that the movement/delta metric data is from January, February or March 2000 or 2001.

If the current record matches the time-filter key criteria, the current record contains data that will directly be utilized in the generation of the processing results. Accordingly, at block 608, the OLAP application 32 adds the time key values for the current record to the TLOV table 40. In an illustrative embodiment of the present invention, the TLOV table 40 obtains time key values for all records that will be directly utilized to process results. The granularity of the time key data entered into the TLOV table (e.g., day, month, or year) will depend on the granularity time key data and the desired results. For example, the organization of movement/delta metric data by fiscal quarter will allow the OLAP application to sort time key data in the TLOV table by month and year. On the other hand, the organization movement/delta metric data by month will allow the OLAP application 32 to sort time key data in the TLOV table by day. Additionally, in an actual embodiment of the present invention, the OLAP application 32 will also include the time key data points defining the search criteria, even if no data exists for those points. As will be explained in greater detail below, the insertion of all the data points will allow the OLAP application 32 to carry over movement/delta metric data.

At block 610, the OLAP application 32 adds the current record to the match table 36 utilizing regular aggregation rules. In an illustrative embodiment of the present invention, the OLAP application 32 first sorts the movement/delta metric records in the match table 36 according to regular identification keys 54 (FIG. 4). Then, the OLAP application sorts the movement/delta metric records according to time keys 56 (FIG. 4). The sub-routine 600 then proceeds to decision block 614, which will be explained in greater detail below.

Returning to decision block 606, if the current record does not match the time-filter key criteria, at block 612, the OLAP application 32 adds the current record to the time-filtered data table 38 utilizing regular aggregation rules. In accordance with the present invention, although will not be utilized to directly process the desired results, because the data matches the identification key, it may be required to process the movement/delta metric data in the match table 36, which will be explained in greater detail below. The sub-routine 600 then proceed to decision block 614.

At decision block 614, a test is done to determine whether there are any database records remaining in the database. If one or more database records remain, the sub-routine 600 returns to block 602, where the next record is set as the current record. On the other hand, if no records remain, the sub-routine 600 returns to routine 500 at block 616.

Figure 10B:
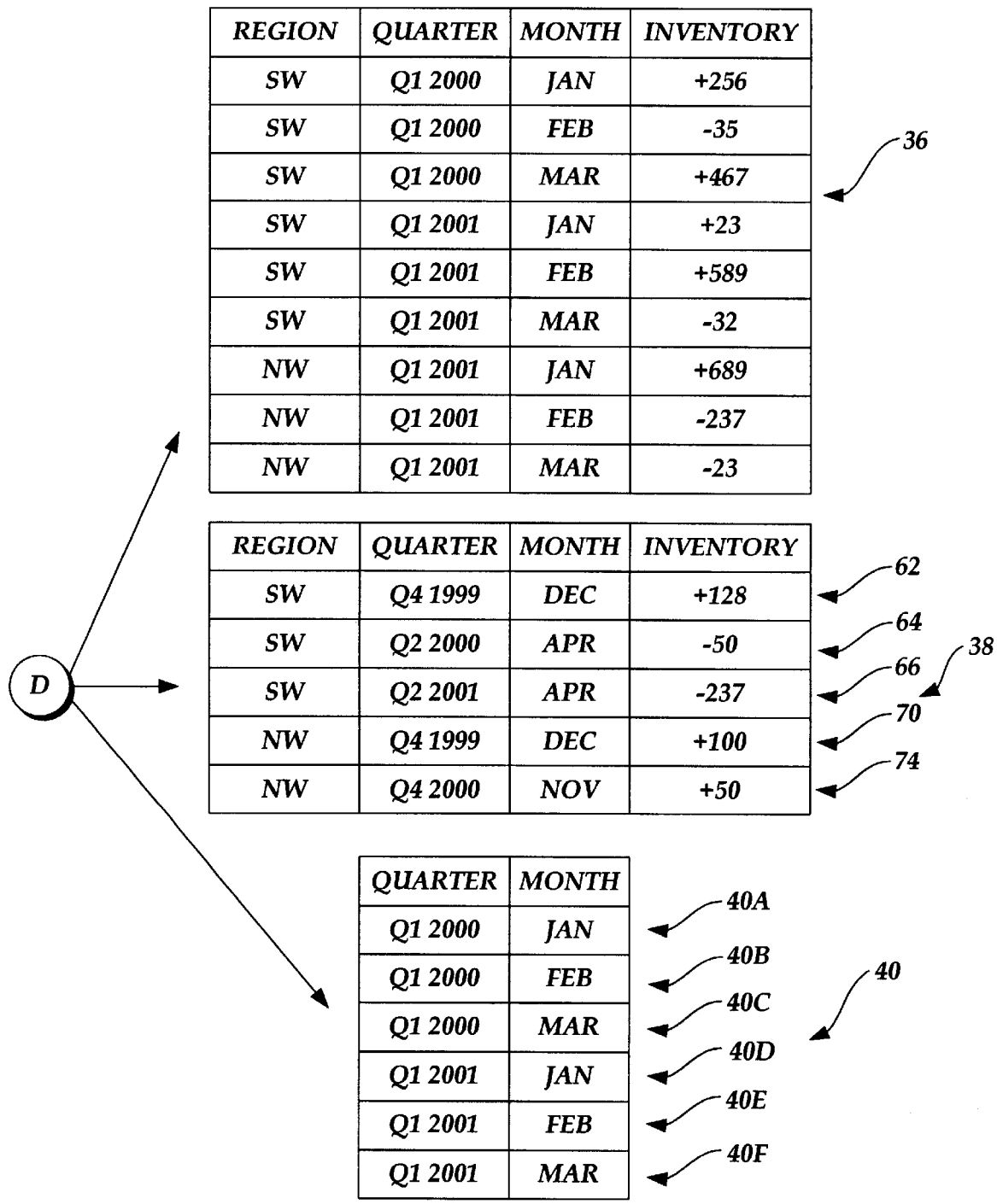

FIGS. 10A and 10B, an illustrative example of sub-routine 600 for search criteria of inventory for the "NW" and "SW" region in the first fiscal quarters of 2000 and 2001 will be illustrated. With reference to FIG. 10A, a database 34 includes a number of records that include a "REGION" regular identification key 34A, a "QUARTER" time identification key 34B, a "MONTH" time identification field 34C, and an "INVENTORY" movement/delta metric field 34D. In an illustrative embodiment of the present invention, the records are not sorted according to any particular order and may include records that may not be utilized in a specific processing of the movement/delta metric data.

Referring now to FIG. 10B, as the OLAP application 32, processes the database records according to sub-routine 600, the OLAP application generates a match table 36 containing records that match the "REGION" regular identification key 34A criteria and the "QUARTER" 34B time identification key criteria. Additionally, the OLAP application 32 generates a time-filtered records table 38 that includes records that match the "REGION" 34A regular identification key criteria, but that do not match the "QUARTER" 34B time identification key criteria. Furthermore, the OLAP application 32 generates a TLOV table 40 including the time key data for each record in the match table. Note that in the illustrative embodiment, the TLOV table 40 includes the time key data from the "QUARTER" 34B and the "MONTH" 34C keys for each record.

Figure 7:
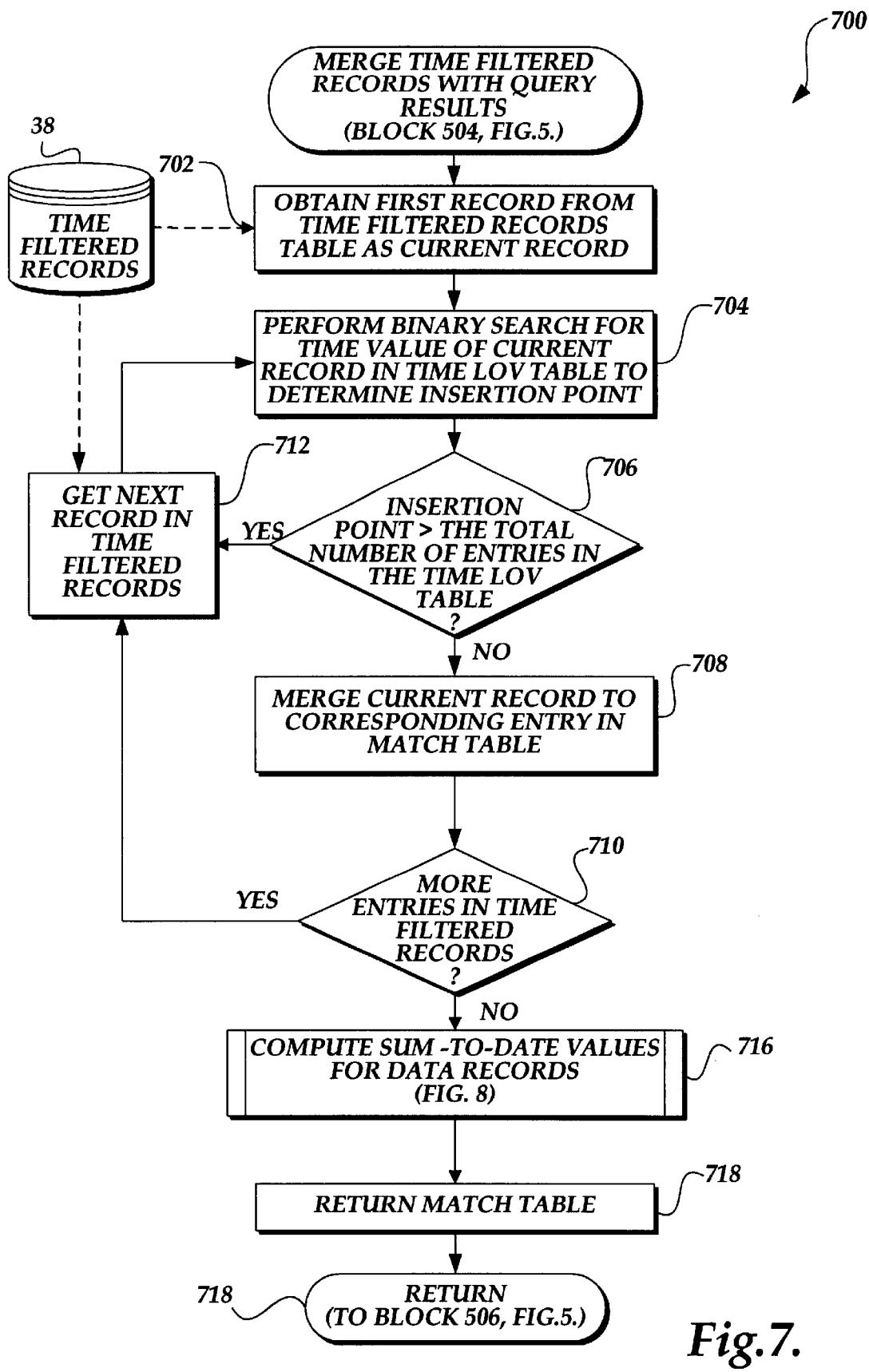
FIG. 7 is a flow diagram illustrative of a time-filter record merging sub-routine in accordance with the present invention.

Returning to FIG. 5, at block 504, the OLAP application 32 merges the time-filtered table 38 with the match table 36. FIG. 7 is a flow diagram illustrative of a time-filter record merging sub-routine 700 utilized by the OLAP application 32 in accordance with the present invention. At block 702, the OLAP application obtains the first record from the time-filtered records table 38 and sets the record as a current record. At block 704, the OLAP application performs a binary search of the current record's time value for an insertion point in the TLOV table 40. As explained above, in some instances the OLAP application 32 may require the movement/delta metric data from records that precede database records matching the time-filter criteria, but are necessary to compute a running total. Accordingly, the OLAP application determines whether the records in the time-filtered records table 38 (which matched the identification key filter criteria) will be required to apply the aggregation rules.

At decision block 706, a test is done to determine whether the insertion point of the time value is greater than the total number of entries in the TLOV table 40. With reference to FIGS. 10A and 10B, in a first pass of sub-routine 700, the current record would be record 62, which has a time value of "Q4 1999" and "December." Accordingly, a binary search would indicate that the insertion point of the record into the TLOV table 40 would be before the first entry of the TLOV table. If the insertion point is greater than all the entries, the movement/delta metric data is not necessary and can be discarded. Accordingly, the sub-routine 700 proceeds to block 712, which will be explained in greater detail below.

Alternatively, if the insertion point is not greater than all the entries in the TLOV table 40, at block 708, the OLAP application 32 adds movement/delta metric data in the current record to the match table 36 using the time key values at the calculated insertion point. In an illustrative embodiment of the present invention, the OLAP application replaces the time key data of the current record from the time-filtered records table 38 with the time key data immediately after the insertion point in the TLOV table 40. The OLAP application 32 then aggregates the current records into the match table 36. Because the match table 36 will contain two records with identical time key data, the OLAP application will sum the two data points. At decision block 710, a test is conducted to determine whether there are additional records in the time-filtered records table 38. If there are no more records, the sub-routine 700 proceeds to block 716, which will be explained in greater detail below. If there are additional records, the sub-routine 700 returns to block 712, where the next record in the time-filtered records table 38 is obtained and set as the current record.

FIGS. 11, 12, 13, 14 and 15 are block diagrams of the match table 36 of FIG. 10B illustrating various iterations of sub-routine 700 from the time-filtered records table 38. With reference to FIGS. 10B and 11, as mentioned above, the first record in the time-filtered record table, record 62, would have an insertion point before the first entry in the TLOV table 40, record 40A, which corresponds to the first entry of the match table 36. Accordingly, the OLAP application 32 would substitute the time key data of the record 62 with the time key data from record 40A in the TLOV table 40, namely "Q1 2000" and "January." Then, the OLAP application 32 would aggregate the current record from the time-filtered records table 38 with the match table 36. As illustrated in FIG. 11, because two records would now contain identical time key data, record 60, the OLAP application 32 sums the "INVENTORY" field 34D data into a single match table record 60.

With reference now to FIGS. 10 and 12, the next entry in the time-filtered records table 38 would be record 63 having a time key value of "Q2 2000" and "April." In accordance with blocks 704–708 (FIG. 7), the OLAP application 32 determines that the insertion point of the current record of time-filtered record in the TLOV table would be between record 40C, "Q1 2000" and "March", and record 40D, "Q1 2001" and "January." Accordingly, the OLAP application would substitute the current record's time key data with the time key data from record 40D in the TLOV table 40 and aggregate the current record into the match table 36, as illustrated at record 64 in match table 36B (FIG. 12).

With continued reference to FIG. 10, the next entry in the time-filtered records table 38 would be record 66 having a time key value of "Q2 2001" and "April." In accordance with decision block 706, the insertion point of the current record would be beyond any of the entries in the TLOV table 40, 40A–40D, and the current record would not be incorporated. Thus, the OLAP application 32 removes records that have a time key beyond the time key data range specified in the current time key filter criteria.

Referring now to FIGS. 10 and 13, the next entry in the time-filtered records table 38 would be record 70 having a time key value of "Q4 1999" and "December." Note that record 70 also includes a regular identification key value of "NW." In accordance with decision blocks 704–708, the insertion point of the current record would be before record 40A, "Q1 2000" and "January." Accordingly, the OLAP application 32 would substitute the current record's time key data with the time key data from record 40D and aggregate the current record into the match table. In this illustrative example, however, the match table 36 does not have a record having a regular identification key of "NW" and time key data of "Q1 2000" and "January." Thus, the OLAP application 32 creates a new entry in the match table 36, as illustrated at record 68 in match table 36C (FIG. 13).

Referring now to FIGS. 10 and 14, the next entry in the time-filtered records table 38 would be record 74 having a time key value of "Q4 2000" and "November." Note that record 70 also includes a regular identification key value of "NW." In accordance with decision blocks 704–708, the insertion point of the current record would be after record 40C, "Q1 2000" and "March", and before record 40D, "Q1 2001" and "January." Accordingly, the OLAP application 32 would substitute the current record's time key data with the time key data from record 40D and aggregate the current record into the match table, as illustrated at record 72 of match table 36D (FIG. 14).

Figure 8:
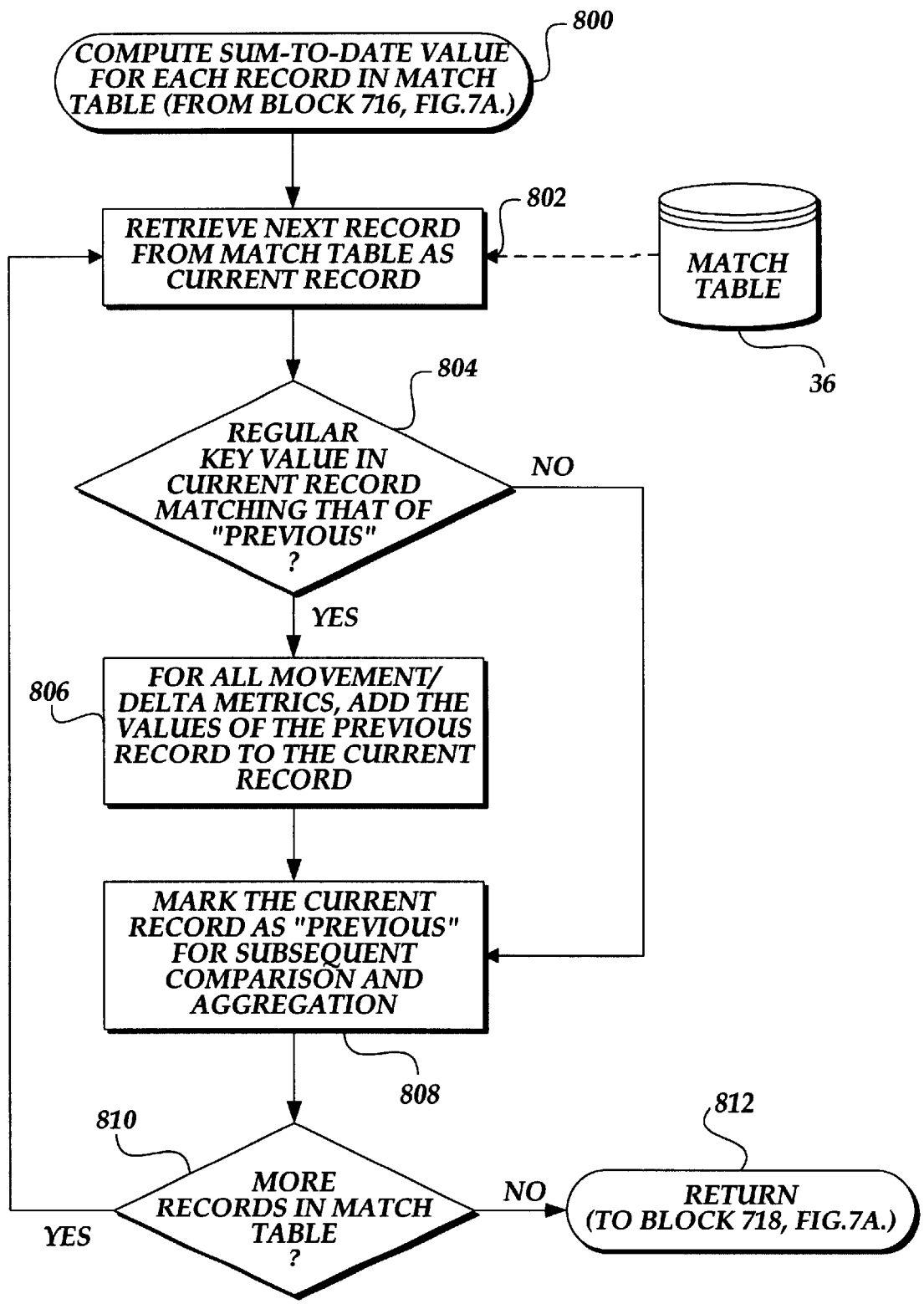
FIG. 8 is a flow diagram illustrative of sum-to-date value computation sub-routine in accordance with the present invention.

Returning to FIG. 7, once all the records from the time-filtered records table 38 have been processed, at block 714, the OLAP application 32 computes the sum-to-date value for each record in the match table. FIG. 8 is a flow diagram of a sum-to-date sub-routine 800 implemented by the OLAP application 32 in accordance with the present invention. At block 802, the OLAP application 32 obtains the next record from the match table 36 and sets the record as the current record. At decision block 804, a test is conducted to determine whether the current record's regular identification key matches the regular identification key of the previous record in the match table. If the regular identification keys do not match, the sub-routine 800 proceeds to block 808.

If the identification keys match, at block 806, the OLAP application 32 adds the value for all movement/delta metric data fields from the previous record to the current record's movement/delta metric data fields. At block 808, the OLAP application 32 marks the current record as "previous" for further comparison purposes. At decision block 810, a test is conducted to determine whether there are any more records in the match table. If there are further records, the sub-routine 800 returns to block 802. If there are no further records, the sub-routine 800 returns to sub-routine 700 at block 812.

FIG. 15 is a block diagram of the match table 36E of FIG. 10 illustrating the sum-to-data processing of FIG. 8. As illustrated in FIG. 15, the OLAP application 32 processes the records in the match table 36 that have matching regular identifiers. For example, the OLAP application sums all the movement/delta metric field values for the "SW" region from record 76 to record 78. Likewise, the OLAP application 32 sums all the movement/delta metric field values for the "NW" region from record 80 to record 82.

Figure 9A:
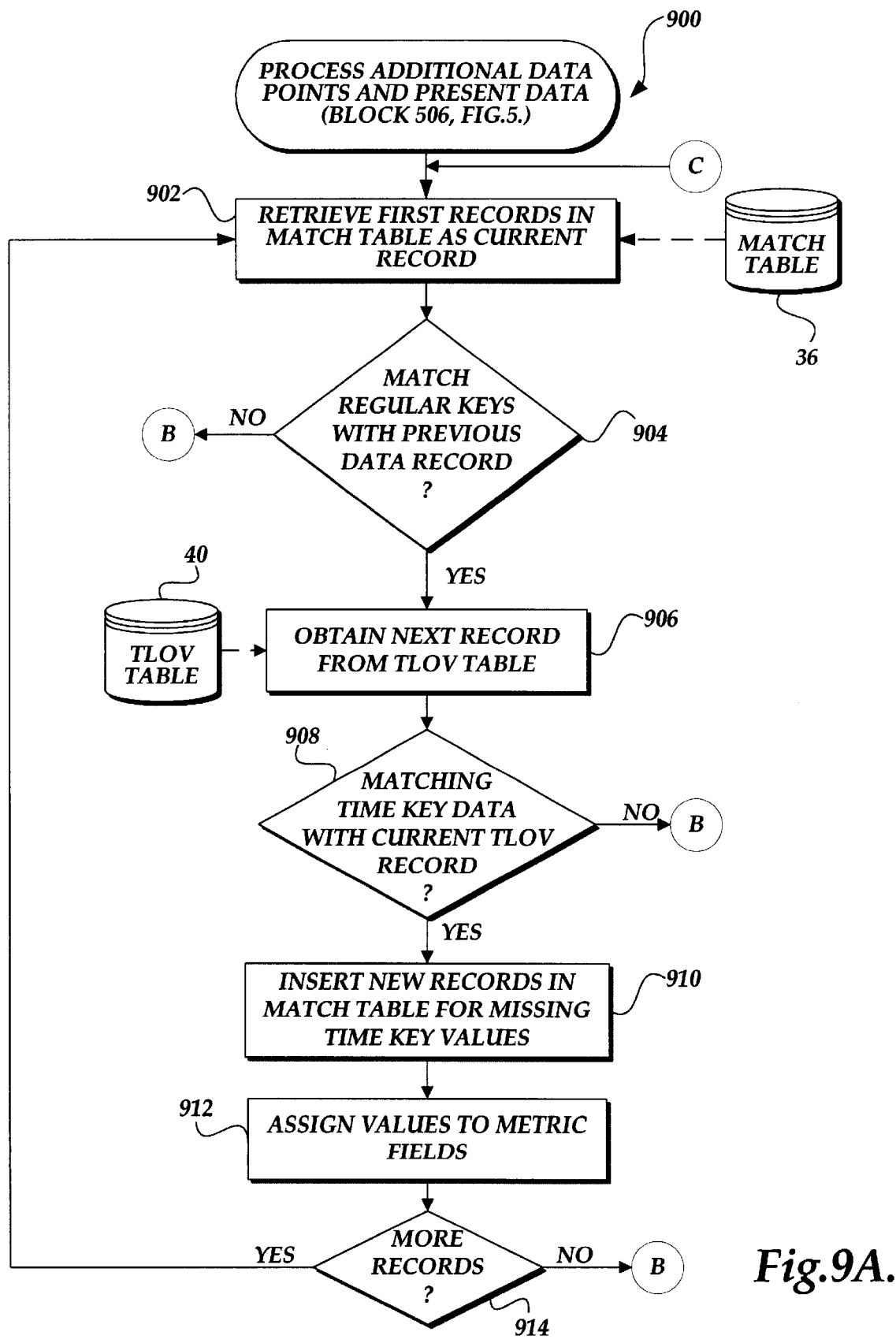
FIGS. 9A and 9B are flow diagrams illustrative of a data processing and presentation sub-routine in accordance with the present invention.
Figure 9B:
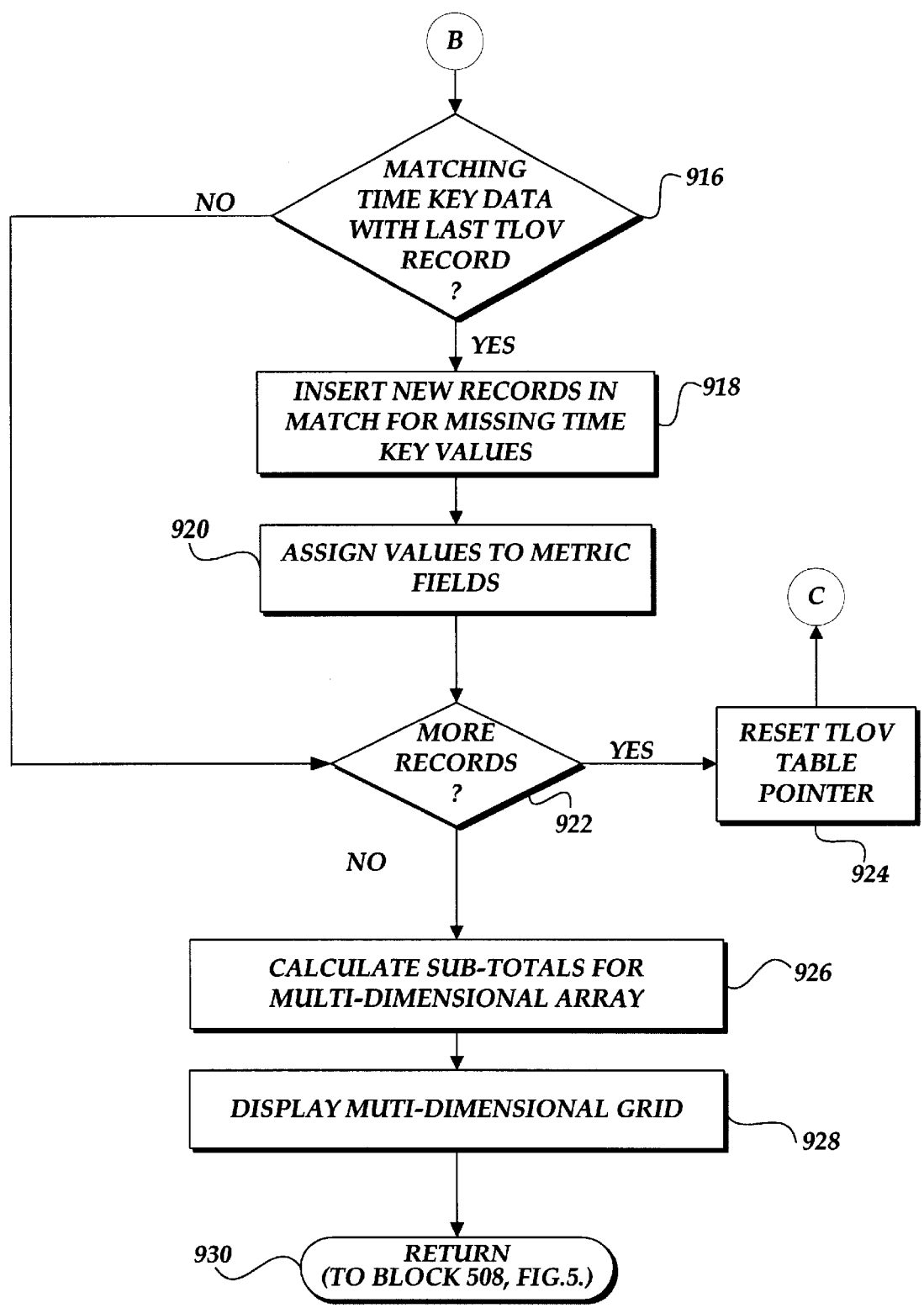

Referring again to FIG. 7, at block 716, the OLAP application 32 returns the match table 36 and the sub-routine 700 returns to routine 500 at block 718. Returning to FIG. 5, at block 506, the OLAP application 32 processes any missing data points and presents the metric data. FIGS. 9A and 9B are flow diagrams of a missing data point and presentation sub-routine 900 implemented by the OLAP application 32 in accordance with the present invention. With reference to FIG. 9A, at block 902, the OLAP application 32 obtains a next record from the match table 36. At decision block 904, a test is conducted to determine whether the regular identification key of a previous record in the match table 36 matches the current record's regular identification key. If the regular identification keys do not match, the sub-routine 900 proceeds to decision block 916, which will be explained in greater detail below.

If the regular identification key match, at block 906, the OLAP application obtains a next record from the TLOV table 40. At decision block 908, a test is conducted to determine whether the match table 36 current record's time key values match the time key value of the current record from the TLOV table 40. If the time key values do not match, at block 910, the OLAP application inserts new records in the match table 36 for all time key values in the TLOV table 40 between the current TLOV table record and the current match table record. At block 912, the OLAP application 32 generates metric data for the new match table records by assigning null values to all regular metric data fields and repeating the value of the movement/delta metric data fields from the previous record in the match table.

After completing block 912, at decision block 914, a test is conducted to determine whether there are any more records in the match table 36. If there are additional records, the sub-routine 900 returns to block 902. If there are no additional records in the match table 36, the sub-routine 900 proceeds to decision block 916 (FIG. 9B).

With reference to FIG. 9B, at decision block 916, a test is conducted to determine whether the time key data from the current record in the match table 36 matches the time key data of the last record of the TLOV table 40. If the time key values match, the sub-routine 900 proceeds to decision block 922, which will be described below. If the time key values do not match, at block 918, the OLAP application 32 inserts new records in the match table 36 for all time key values in the TLOV table 40 between the match table current record's time key data and the last record in the TLOV table 40. At block 920, the OLAP application 32 generates metric data for the new match table records by assigning null values to all regular metric data fields and repeating the value of the movement/delta metric data fields from the previous record in the match table.

Once the metric data has been generated at block 920, at decision block 922, a test is conducted to determine whether there are more records in the match table 36. If more records exist, at block 924, the OLAP application 32 resets the TLOV pointer to the first record and the sub-routine 900 returns to block 902 (FIG. 9A).

Alternatively, if there are no more records in the match table 36, at block 926, the OLAP application 32 calculates sub-totals for the multi-dimensional array. At block 928, the OLAP application 32 displays the multi-dimensional pivot table. In an illustrative embodiment of the present invention, the OLAP application 32 calculates sub-totals of the metric data. With reference to the previous example, the OLAP application could calculate sub-totals for inventory by region and by month, even though the search criteria only specify for the display of inventory amounts by fiscal quarter. At block 930, the sub-routine 900 returns to routine 500.

FIG. 16 is a block diagram of two multi-dimensional grids 84, 86 processed in accordance with the present invention. As illustrated in FIG. 16, the first multi-dimensional grid 84 includes a first row displaying the inventory numbers for the "SW" region according to month, and including a total. The grid 84 also includes a second row displaying the inventory numbers for the "NW" region according to month. Note that because there was no additional movement/delta metric data for the "NW" region in January, February and March, the OLAP application 32 carries the previous movement/delta metric data through the grid. Finally, the grid 84 includes a sum total field 90. Similar to grid 84, the OLAP application also displays a second grid 86 corresponding to the second fiscal quarter inventory numbers. The second grid includes a "NW" region subtotal row 86, a "SW" region subtotal row 88 and a total inventory number row 90.

Referring again to FIG. 5, at block 508, the routine 500 terminates.

In accordance with an aspect of the present invention, the OLAP application 32 processes the movement/delta metric data according to regular aggregation rules by taking into account additional movement/delta metric not directly involved in the processing. Additionally, the OLAP application 32 takes into account null values for one or more time key values not present in the database records. Still further, the OLAP application 32 can also process database records from multiple sources, in which the data records do not have to be ordered in any manner.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for processing data records including movement/delta metric data in an analytical processing environment, the method comprising:
    obtaining a database containing the data records;
    generating a match table and a time-filtered records table from the data records; and
    merging the time-filtered records table with one or more records in the match table; and
    presenting the merged match table records in a multi-dimensional table.

2. The method as recited in claim 1 further comprising generating a time list of values table from the data records.

3. The method as recited in claim 2, wherein generating the match table, time-filtered table and time list of values table includes:
    filtering the data records based on a regular identification key filter;
    filtering the data records based on a time key filter; and
    generating the match table, the time-filtered table and the time list of values from the filtered data records.

4. The method as recited in claim 3, wherein the match table includes a table of data records matching the regular identification key filter and the time key filter.

5. The method as recited in claim 3, wherein the table of time-filtered records includes a table of data records matching the regular identification filter, but not matching the time key filter.

6. The method as recited in claim 3, wherein the time list of values table includes a table containing a list of district time key values associated with data records matching said time key filter.

7. The method as recited in claim 2, wherein merging the table of time-filtered values with the match table includes:
    obtaining a first data record from the time-filtered record table as a current record, the data record including time key data;
    searching the time list of values table for a time record most closely related to the time key data of the current record to determine an insertion point for the current record;
    merging the current record with a record in the match table corresponding to the time key data if the insertion point is not greater than a last entry in the time list of values table.

8. The method as recited in claim 7, wherein merging the current record with a record in the match table includes:
    obtaining time key data from a record in the time list of value table immediately after the insertion point;
    replacing the time key data from the current record in the time-filtered records table with the time key data from the time list of values;
    adding the current record from the time-filtered records table to the match table; and
    aggregating the match table.

9. The method as recited in claim 8, wherein aggregating the match table includes summing one or more movement/delta metric fields if more than one record having matching regular identification key and time key fields.

10. The method as recited in claim 7 further comprising repeating the process for all records in the time-filtered records table.

11. The method as recited in claim 2, wherein merging the table of time-filtered values with the match table includes computing sum-to-date values for one or more records in the match table.

12. The method as recited in claim 11, wherein computing the sum-to-date values includes:
    obtaining a record from the match table as the current record;
    if a regular identification key associated with the current records matches a regular identification key of a previous record, summing the values of one or more movement/delta metric fields of the current records with corresponding movement/delta metric fields of the previous record; and
    repeating the process for each record in the match table.

13. The method as recited in claim 12 further comprising repeating the computation of sum-to-date values for each unique regular identification key in the match table.

14. The method as recited in claim 2, wherein presenting the merged match table records in a multi-dimensional table includes:
    determining whether there are one or more missing movement/delta metric records corresponding to the time key query; and
    inserting one or more records into the match table corresponding to the missing movement/delta metric records.

15. The method as recited in claim 14, wherein inserting the one or more records includes:
    entering null values for any regular metric fields; and
    carrying over a movement/delta metric field value from a previous record for all movement/delta metric fields.

16. A computer-readable medium having computer-executable instructions operable for performing the method recited in any one of claims 1–15.

17. A computer system having a processor, a memory and an operating environment, the computer system operable to perform the method recited in any one of claims 1–15.

18. A computer-readable medium having computer-executable modules for processing data records including movement/delta metric data in an analytical processing environment comprising:
    a match table module including a table of data records from a data source matching a regular identification key query and a time key query, the match table module operable to obtain a total value for movement/delta metric data; and
    a time-filtered records table module including a table of data records matching the regular identification query, but not matching the time key query, the time-filtered records table module operable to provide additional movement/delta metric data corresponding to the calculation the total value for the movement/delta metric data.

19. The computer-readable medium as recited in claim 18 further comprising a list of values table module includes a table containing a list of district time key values associated with data records in the match table module, the time list of values table module operable to facilitate the merging of the time-filtered records table module and the match table module.

20. A system for processing movement/delta metric data, the system comprising:

a data source including one or more data records, the data records including at least one field having movement/delta metric data thereon;

means for processing the movement/delta metric field data according to an inputted set of criteria; and means for displaying the processed movement/delta metric field data.

21. The system as recited in claim 20, wherein the means for processing the movement/delta metric field include means for generating a match table and a time-filtered records table, wherein the match table and time-filtered records table each contain a subset of the one or more data records from the data source.

22. The system as recited in claim 21, wherein the means for processing the movement/delta metric field data include means for generating a time list of values table containing time key data from at least one record in the match table.

23. The system as recited in claim 21, wherein the means for processing the movement/delta metric field data includes means for merging records from the time-filtered records table with one or more records in the match table.

24. The system as recited in claim 20, wherein the means for displaying the processed movement/delta metric field data includes means for accounting for missing or null value records.

* * * * *